April 21, 1925.

A. HANSEN

BATHTUB MOLD

Filed April 5, 1924   4 Sheets-Sheet 1

1,534,779

WITNESSES
Oliver W. Holmes

INVENTOR
Abel Hansen
BY Knight Bros
ATTORNEYS

April 21, 1925.
A. HANSEN
BATHTUB MOLD
Filed April 5, 1924
1,534,779
4 Sheets-Sheet 2
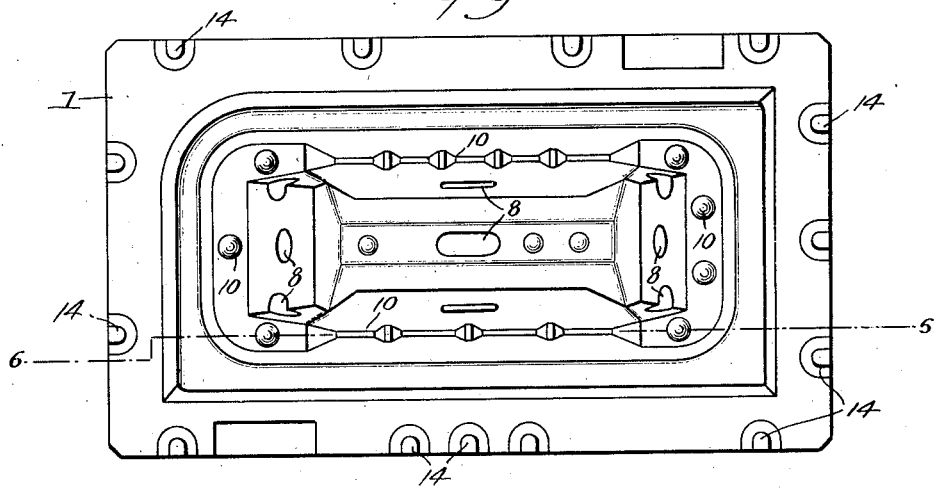
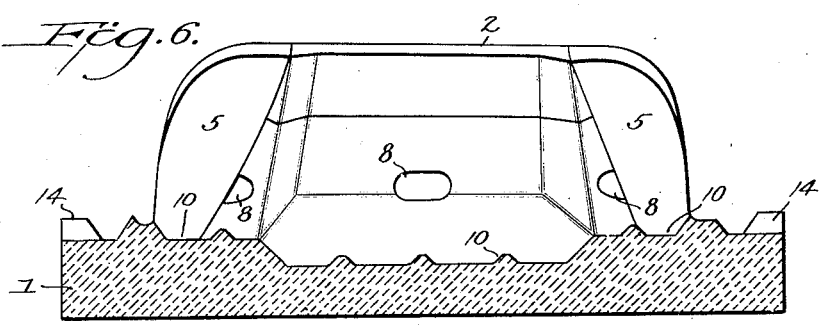
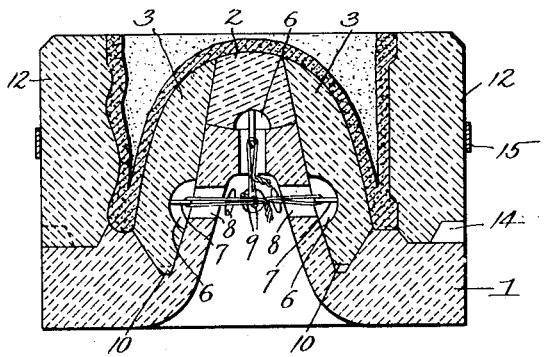
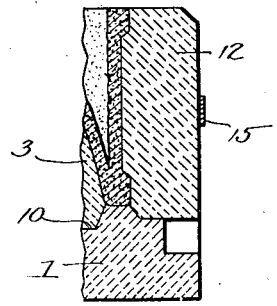
WITNESSES
Oliver W. Holmes
INVENTOR
Abel Hansen
BY
Knight Bro
ATTORNEYS April 21, 1925.
A. HANSEN
BATHTUB MOLD
Filed April 5, 1924     4 Sheets-Sheet 3
Fig. 9.
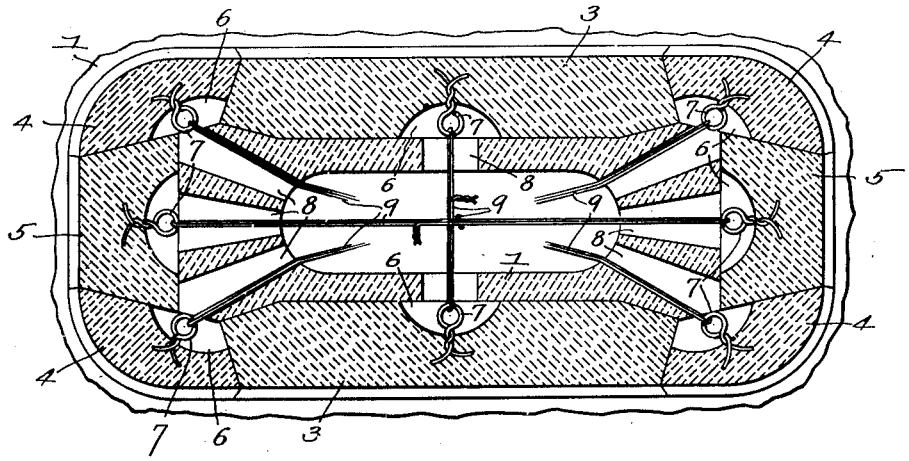
Fig. 10.
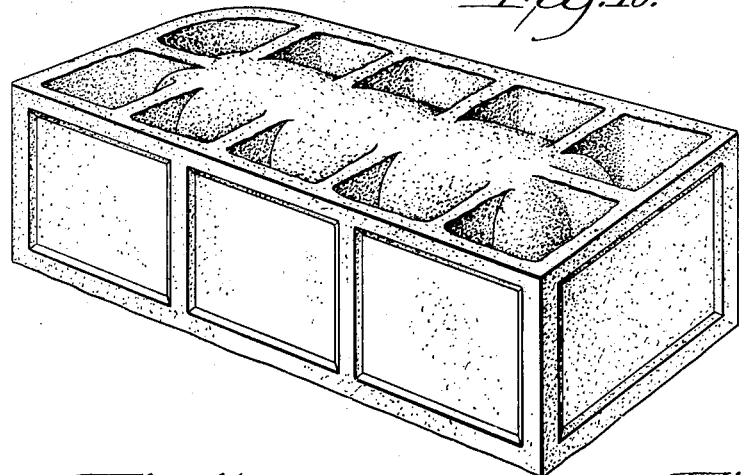
Fig. 11.      Fig. 12.
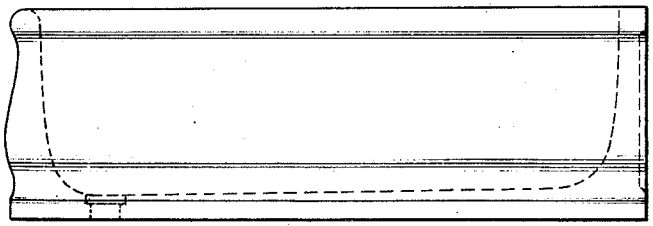 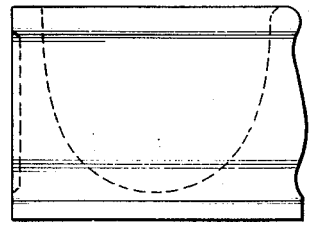
WITNESSES      INVENTOR
Abel Hansen
BY
Knight Bro
ATTORNEYS April 21, 1925.

A. HANSEN

BATHTUB MOLD

Filed April 5, 1924

WITNESSES
Oliver W. Holmes

INVENTOR
Abel Hansen
BY
Knight Bro
ATTORNEYS

Patented Apr. 21, 1925.

1,534,779

UNITED STATES PATENT OFFICE.

ABEL HANSEN, OF METUCHEN, NEW JERSEY.

BATHTUB MOLD.

Application filed April 5, 1924. Serial No. 704,463.

*To all whom it may concern:*

Be it known that I, ABEL HANSEN, a citizen of the United States, and a resident of Metuchen, county of Middlesex, State of New Jersey, have invented certain new and useful Improvements in Bathtub Molds, of which the following is a specification.

This invention relates to molds for facilitating the manufacture of molded clay articles, such, for example, as porcelain bath tubs.

The invention comprises a combination of mold parts built up in such a way as to form a rigid mold body and yet permit the removal of the parts one by one so as to cause no injury to the molded article. The invention will be better understood by being described with reference to the accompanying drawings, in which Figure 1 is a plan view of the mold and the bath tub formed therein.

Figure 5 is an underside view of the core mold.

Figure 6 is a longitudinal section on the line 6—6 of Figure 5.

Figure 7 is a transverse vertical section on the line 7—7 of Figure 2.

Figure 8 is a detail section on the line 8—8 of Figure 1.

Figure 9 is a horizontal section on the line 9—9 of Figure 3 of the core mold.

Figure 10 is a perspective view of the bath tub inverted.

Figure 11 is a side view of the bath tub.

Figure 12 is an end view of the bath tub.

Figure 1:
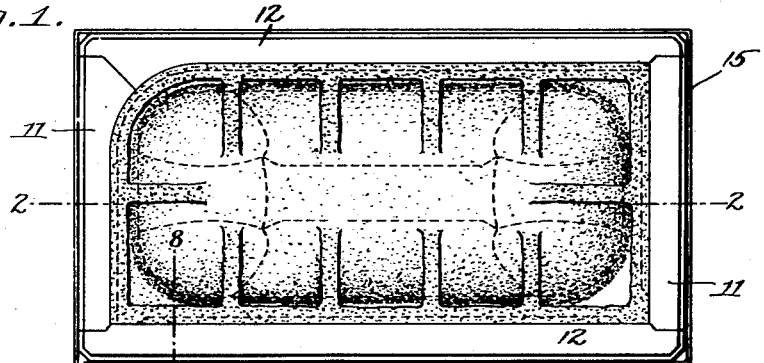
Figure 2:
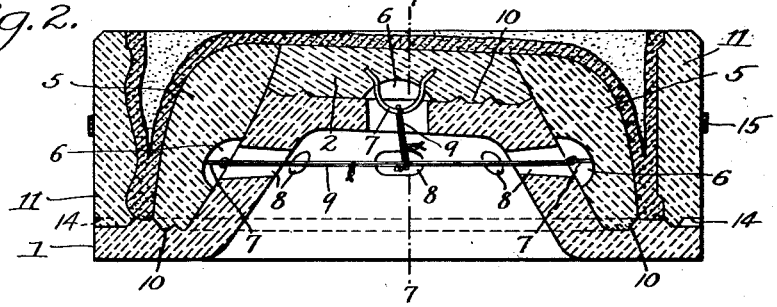
Figure 2 is a longitudinal vertical section on the line 2—2 of Figure 1, through the center of the same.
Figure 3:
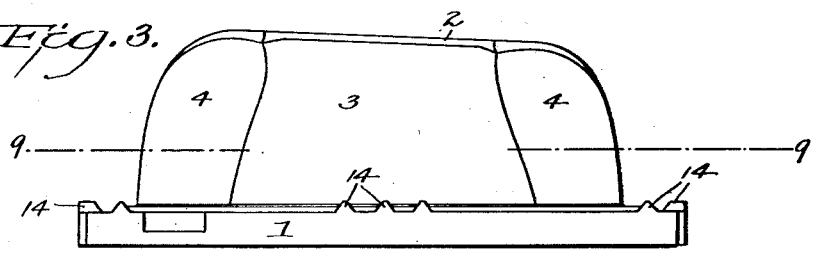
Figure 3 is a side elevation of the central core.
Figure 4:
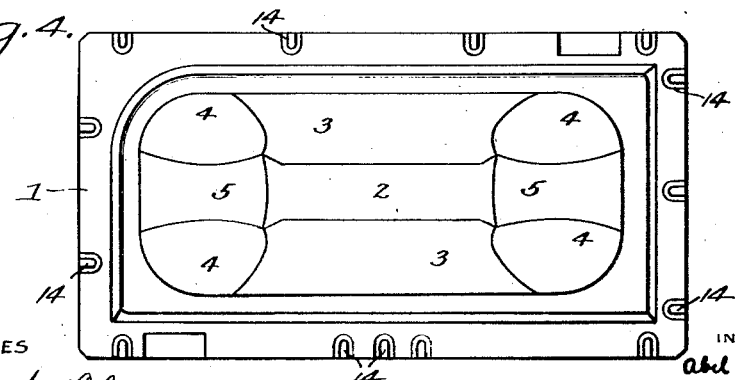
Figure 4 is a plan of the same.
Figure 13:
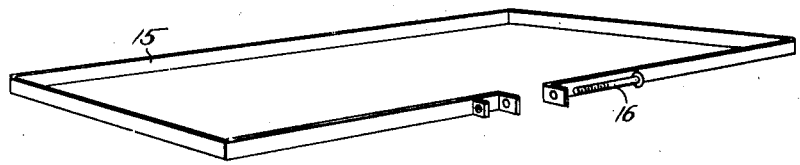
Figure 13 is a perspective view of the surrounding clamp of the outside mold.
Figure 14:
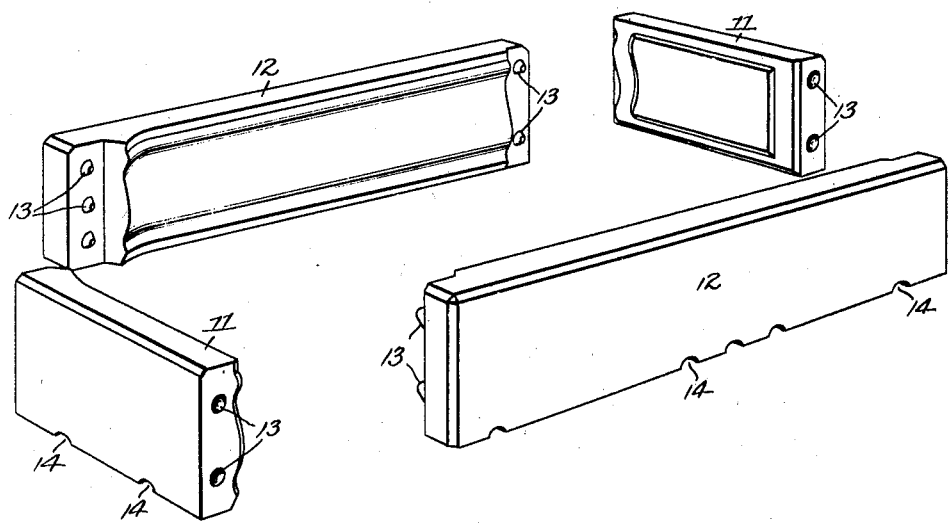
Figure 14 is a perspective view of the sides of the outside mold.
Figure 15:
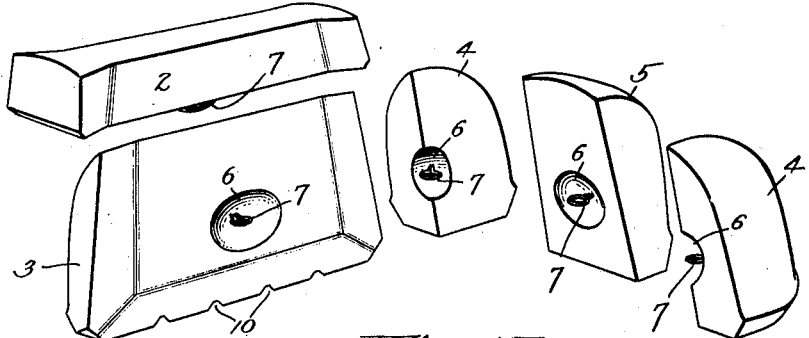
Figure 15 is a perspective view of the outside members of the core mold.

The mold is made of two principal parts, one being the core for forming the inside of the tub or other article to be molded, and the other the box for forming the outside. To make the core, I first use a foundation or bed plate 1, upon which I assemble a number of molded pieces 2, 3, 4 and 5, which pieces are so shaped as to form, when assembled, a shape, the exterior of which is an exact counterpart of the interior that it is desired to have the article take. These pieces have recesses 6, in which an eye 7 is located and opposite each of these recesses in the bed plate are orifices 8. By means of cords or wires 9, the outside mold pieces may be securely fastened together and held tightly to the central core or base, by having the wires or cords 9 pass through the eyes 7 and twisting or tying them together in the central part of the hollow base. When so secured together, the various parts of the core mold are held rigidly together, and this rigidity is increased by tongues and grooves 10, between the bed plate and the mold pieces. In fact, the core thus assembled is sufficiently rigid to enable the turning over of the mold without bringing any strains to bear upon the molded article. The outside of the mold is formed of two end slabs 11 and two side slabs 12 with dowels 13 and tongue grooves 14 for holding them in fixed relation to each other and to the bed plate. A clamp 15 (see Figures 13 and 1) with a tightening bolt 16, entirely surrounds the four slabs and by means of the bolt 16 may be used to hold the sides rigidly together. With the core assembled and the outside slabs arranged to form a box-like structure around the core, the clay may be applied to the mold, and owing to the rigidity of the mold, it may be firmly pressed into place and distributed with an even thickness, that has not heretofore been attainable without the use of such a mold. To remove the mold from the clay article, the whole assembly is turned over with the core on top. By then cutting the wires or cords 9 the bed plate 1 may be first removed, then the central core 2, the sides 3 and the end pieces 4 and 5 consecutively taken out, without in any way disturbing or causing a fracture to occur in the molded piece. Moreover, the rigidity of the assembled parts is sufficiently great to insure that in turning over the mold, no strain is brought to bear upon the molded article. After the core has been removed, the bolt 16 may be slackened and the clamp 15 removed, permitting the sides of the outside mold to be taken away. A clay article molded in this way will have an approximately uniform thickness, so that it will not be subject to shrinkage cracks due to undue thickness in certain parts. It will dry out uniformly and will be found to give a far less number of defective pieces.

I claim:—

1. A mold for forming clay objects, comprising a core member constituted of a base having openings therethrough, and mold-forming sections applied thereto, with means for securing the sections to the base and to each other.

2. In a mold for forming molded bath tubs, the combination of a base plate having a hollow central protuberance, a number of mold-forming sections closely fitting each other and the said protuberance, means for holding the sections to each other and to the base plate and side members for forming the outside of the tub mounted on said base plate, with means for securing the sides against lateral displacement, and means for clamping the four sides together.

ABEL HANSEN